Aug. 22, 1950

A. GARRIGUE ET AL 2,519,643

AUTOMATIC STONING-SORTING MACHINE

Filed Jan. 14, 1949

Inventors:
A. Garrigue and
F. Sarraky
By E. F. Wenderoth Atty

Aug. 22, 1950     A. GARRIGUE ET AL     2,519,643
AUTOMATIC STONING-SORTING MACHINE

Filed Jan. 14, 1949     2 Sheets-Sheet 2

Inventors
A. Garrigue
and F. Sarraky
By E. F. Wenderoth
Atty

Patented Aug. 22, 1950

2,519,643

UNITED STATES PATENT OFFICE 2,519,643

AUTOMATIC STONING-SORTING MACHINE

Albert Garrigue and François Sarrahy, Perpignan, France

Application January 14, 1949, Serial No. 70,826
In France January 21, 1948

6 Claims. (Cl. 146—28)

The object of our invention is an automatic stoning-sorting machine for apricots and other free-stone fruit.

This machine, designed for the stoning of apricots with separation of the cut portions, has been carefully considered with a view to cutting out the main drawback of stoning devices such as they are at present on the market: failure to find quickly an answer to the fundamental question as to how to position the apricot correctly before the machine comes into action on it. This question, that has been solved up to now either by placing the apricot in position by hand, or, by substituting a mechanical arm for the work by hand, has been solved in an entirely novel fashion in the machine that forms the object of our invention, where in this case the apricots are placed automatically into a suitable position.

This machine is characterised by all or a portion of the following arrangements taken singly or combined together:

(a) The fruit is brought on edge to a circular cutting saw, by passing over an assembly of two cylinders with parallel axes that are slightly sloped from the horizontal line, and revolve at the same speed in reverse directions.

(b) The stoning is obtained by delivering the fruit on its edge to the circular cutting saw by means of two substantially cylindrical-shaped bodies of rubber, for instance, revolving at the same speed and in opposite directions, between which the fruit is drawn and held during the operation, so that the stone is sent back to the rear, while the two cut portions are drawn forward.

(c) The fruit may be brought to the cylinders supplying the fruit on its edge by a conveyor-belt that constitutes the bottom of a feed-hopper.

(d) Between the cylinders for leading in and the cylindrical bodies used for holding the fruit while it is being stoned are arranged two guiding nipples for simplifying the travel of the fruit from one to the other of these two sets of cylinders, without altering their position on edge.

(e) Provision is made underneath the leading-in cylinders of a discharge shoot for fruit that is too small in size; and below the cylindrical bodies is a discharge chute for the stones.

Other characteristic features of detail will make their appearance as the description proceeds that is given as an example of the particular type of execution illustrated in the accompanying drawings in which.

Figure 1:
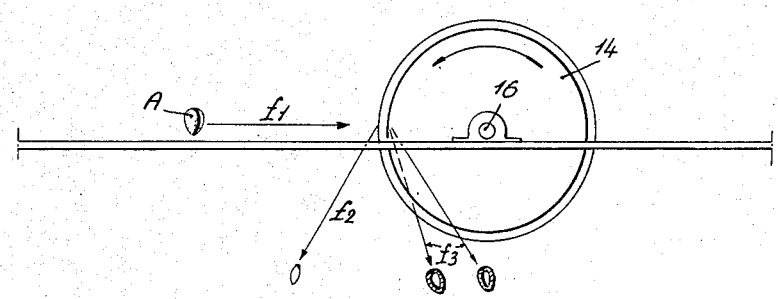
Fig. 1 is a diagrammatic elevational view illustrating the working principle of the machine.

In this machine, the stoning is carried out (Figures 1 and 2) by a circular cutting saw 14, fixed to and rotating with a horizontal shaft 16 so as to operate from top to bottom on any apricot A that is delivered in a horizontal line with its axis. The apricots, in order to be stoned in a suitable manner, must offer their edge to the blade in the direction of the arrow $f_1$ so that the stone, on meeting the blade is, on account of its very nature, thrown back by the impact, following the direction of the arrow $f_2$ of Figure 1, while the two cut portions travel forward, on each side of the blade, through the effect, on the one hand, of a slight mechanical push executed in an obvious way, and on the other hand, through the adhesion of the flesh of the fruit to the blade. This clinging tendency gives way immediately to centrifugal action and the two cut halves fall underneath the machine, following the direction of the arrows $f_3$ of Figure 1.

All that has to be done is to steer the stones and cut portions of the fruit so that they fall, through chutes sloped at the beginning like the arrows $f_2$ and $f_3$, on to their respective conveyor belt or collecting receivers for the completion in an easy manner of the stoning of the fruit.

Figure 2:
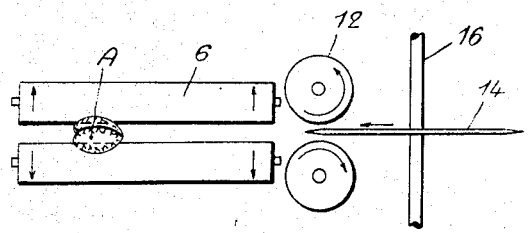
Fig. 2 is a plan view of the diagrammatic showing in Fig. 1.
Figure 3:
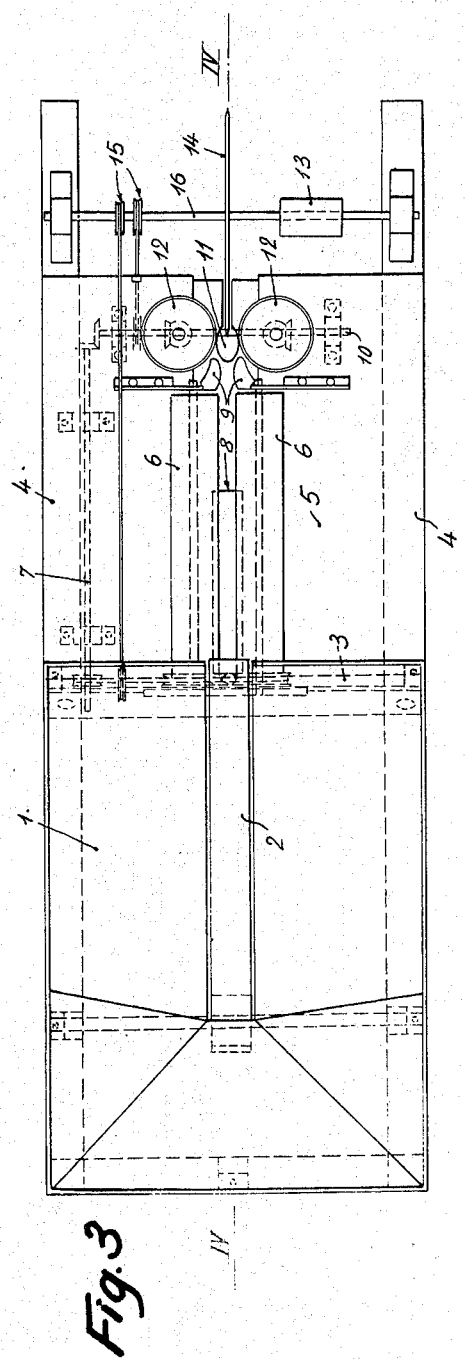
Fig. 3 is a plan view of the invention.
Figure 4:
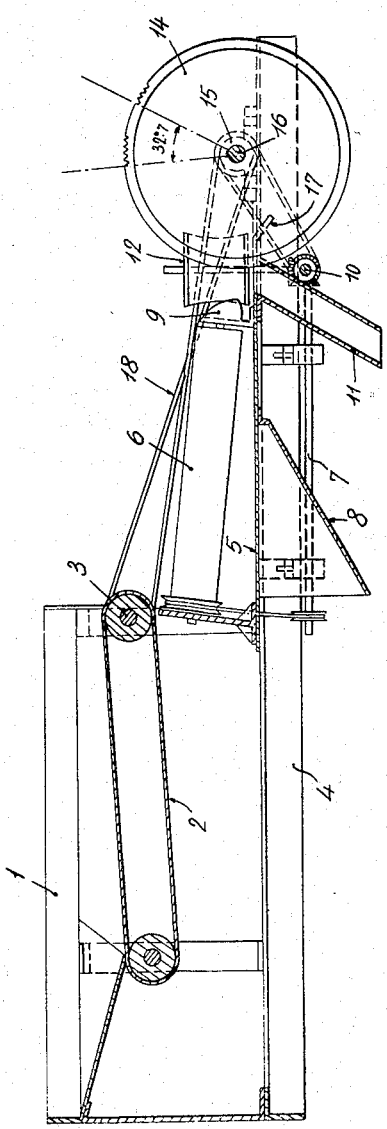
Fig. 4 is a cross-sectional view taken upon section line IV—IV of Fig. 3.

The fruit is held, during the stoning operation, by two cylindrical bodies 12 of rubber, arranged on each side of the cutting saw 14. These are both exactly the same and of a suitable diameter. They rotate in opposite directions as shown by the arrows of Figure 2, round two vertical axes that are symmetrical in relation to the tangent vertical to the cutting saw and to the plane of the latter. The spacing between the two distributors is figured so that, on the one hand, the fruit gripped is held wedged between the flexible surfaces of these revolving cylindrical bodies during the stoning operation and, on the other hand, the two cut portions are not spoiled by any unduly rough pressure.

The positioning on edge of the apricots so that they may be delivered to the cutting saw 14 by means of the two distributors 12, is obtained by an assembly of two cylinders 6 fairly close together with parallel axes slightly sloped, revolving at the same speed and in opposite directions on their axes.

The position of stable equilibrium for each each fruit falling between these cylinders and big enough so as not to slip through the space between, is that wherein the edge of the fruit occupies the interstitial space. The motion of the rollers helps the fruit to quickly assume this position and at the same time it causes the fruit to slide along in the direction of the slope. When it comes to the end of the rollers, it falls between the distributors 12 that seize it and place it in front of the saw that completes the stoning.

The space to be left between the two rollers amounts to the minimum thickness of the apricots allowed for the stoning machine, and the undersize fruit is automatically eliminated and drops below the machine. An adjustment of the spacing between the rollers enables fruit to be discarded that is below a given size and thus carry out a process of sorting according to size.

The assembly of the stoning machine properly so called, comprising the cutting saw 14, the distributors 12, the leading-in rollers 6, may be supplied, at the top with an endless belt 2 bringing in the apricots, and at the bottom with another endless belt for discharging the cut portions, stones and unsuitable apricots towards their respective point of delivery.

These accessory parts may be used for other stoning machines that are exactly the same and are located parallel to each other on the same table.

The various component parts of the machine are fastened and mounted on a metallic frame constituting a horizontal table 5. They may be established as follows:

The cutting saw consists of a circular disc, of rustless steel and provided with smooth cutting sectors and sectors provided with saw teeth. For instance, it may have a diameter of 300 mm. and be provided with eleven sectors each composed of a set of four notches giving 3 saw teeth of 1 cm. apart followed by a cutting portion of about 6 cm. long. These alternating stretches of cutters and of saw teeth enable the cutting out of the two portions of the fruit to be carried out under the best conditions accompanied by the discarding of the stone. The most satisfactory speed for the operation would appear to be 200 R. P. M.

The ball bearings for the horizontal shaft 16 of the saw are fastened on supporting longitudinal girders 4. This shaft carries by the side of the saw, the driving pulley 13 and two grooved pulleys 15 that enable the motion to be conveyed by means of trapezoidal belt one to the driving shaft 10 of the distributors, the other to the driving shaft 3 of the conveyor belt 2 bringing the apricots from the receiving hopper 1 to the machine.

The stones are cast into a chute of oval cross-section 11, with its axis in the plane of the saw 14, and fastened under the supporting metal plate 5 at right angles with the vertical tangent of the disc along an axis very slightly oblique outside the tangent. It brings them either into a container, or on to a collecting belt.

The cut portions are steered in their fall by the shape of the notched metal plate 17 in which passes the cutting saw, a plate that is inclined downwards at about 45° of slope. They are collected likewise by a container or, better still, a collecting belt.

The distributors 12 have each been made up of two metal rings, fitted on a central spindle and between which is stretched a cylindrical sleeve of unbacked rubber, held in position by a brass ring, screwed through the rubber on each of these rings. The sleeve when it is positioned in this way assumes a slightly curved shape and full play may be made of their flexibility in the clear space between rings. They are driven in any suitable way, for instance, by bevel pinions from a cross shaft 10 parallel to the shaft 16 of the saw and driven by it.

They might be formed besides in quite a different way enabling driving surfaces to be effected that are substantially cylindrical and flexible enough, for instance by bodies of solid rubber covered with a light layer of sponge rubber.

The rollers or leading-in cylinders 6 are each formed, in this example, by a metallic tube provided towards its higher end with a groove intended to take the round driving belt. The spindle of this cylinder, sloped at about 10° above the horizontal and falling towards the distributors rests at the two ends in bronze sleeves fixed rigidly with suitable bearings, connected to the metal plate frame, by slides enabling the spacing apart of the rollers to be adjusted.

These rollers are supported, on the side located near the distributors, by cheek plates that are as thin as possible and that are extended by guides in the shape of nipples 9 that hold the fruit, leaving the leading-in rollers, in position on edge and steer it in its short drop forward towards the distributor.

The motion of the two rollers, in opposite directions, is controlled by a round cross-belt between them and moved by a grooved pulley fastened on a horizontal and longitudinal shaft 7, itself driven, by means of bevel pinions, by the shaft 10 driving the distributors. The preferable speed for the rollers appears to be about 200 R. P. M.

The grooves and the belt are protected against an untimely fall of the fruit by a heading of the frame. In the same way a longitudinal casing, flush with the top of the rollers over all their length and fastened to the frame, prevents the fruit from being sidetracked when they fall on the latter. An opening of the frame-plate 5, furnished with a chute 8 straight below the first two-thirds in length of the rollers, enables the automatic discard to be effected of undersize fruit that goes through the space between the cylinders.

The feeding has been carried out in a very easy manner in this example of execution by means of a slightly rising belt 2, from which the fruit is tipped above the high end of the rollers 6. It is flush with the bottom of a fixed hopper 1 of large area. The slopes of this bottom are designed so that every apricot placed on it rolls by itself, except for some impediment, as far as the conveyor-belt 2.

The movement of this belt is controlled by grooved pulley and trapezoidal belt or by bevel pinions and sprocket chain, its motion being taken, for instance, from the horizontal shaft of the cutting saw.

What we claim is:

1. Machine for stoning fruit such as apricots comprising in combination means for conveying and correctly orienting fruit, two cylinders rotating on vertical axes in opposite directions for gripping and holding said oriented fruit during stoning, having their longitudinal axes parallel and substantially perpendicular to the direction said fruit is conveyed by said conveying means, said cylinders being spaced from one another by a distance at least equal to the dimension of the fruit, gripping surfaces on said cylinders formed of yielding material for holding and moving said fruit forwardly without rotation during the stoning operation, and a circular cutting blade rotating downwardly between said cylinders having smooth cut sectors interrupted by a saw cut sector for cutting the fruit along its middle plane and ejecting the stone.

2. Machine for stoning fruit such as apricots comprising in combination two parallel cylinders slightly inclined downwardly from the horizontal, said cylinders being spaced from one another less than the minimum diameter admissible for the fruit, means for rotating said cylinders in opposite directions to convey and correctly orientate the fruit, two rotating parts having cylindrical gripping surfaces of flexible material for gripping said fruit on leaving said cylinders and moving it forwardly without rotation during the stoning operation and a circular cutting blade rotating downwardly between said rotating parts having smooth cut sectors interrupted by a saw cut sector for cutting the fruit along its middle plane and ejecting the stone.

3. Machine for stoning fruit such as apricots comprising in combination two parallel cylinders slightly inclined downwardly from the horizontal, said cylinders being spaced from one another less than the minimum diameter admissible for the fruit, means for rotating said cylinders in opposite directions to convey and correctly orientate the fruit, two rotating parts having cylindrical gripping surfaces of flexible material for gripping said fruit on leaving said cylinders and moving it forwardly without rotation during the stoning operation, fixed guides between said cylinders and said rotating parts for supporting the fruit during its passage, and a circular cutting blade rotating downwardly between said rotating parts having smooth cut sectors interrupted by a saw cut sector for cutting the fruit along its middle plane and ejecting the stone.

4. Machine according to claim 1, in which a chute is provided for discharge of the stones below the space between said cylinders.

5. Machine according to claim 1, in which said rotating cylinders are formed by a rubber sleeve clamped between two cheeks.

6. Machine according to claim 1, in which said rotating cylinders are formed by a core of rubber coated with a layer of sponge rubber.

ALBERT GARRIGUE.
FRANÇOIS SARRAHY.

REFERENCES CITED

The following references are of record in the file of this patent:

UNITED STATES PATENTS

| Number | Name | Date |
|---|---|---|
| 376,904 | Phillips | Jan. 24, 1888 |
| 404,517 | Briggs et al. | June 4, 1889 |
| 1,386,552 | Carney | Aug. 2, 1921 |
| 1,600,567 | Roberts | Sept. 21, 1926 |
| 1,683,918 | Riddell | Sept. 11, 1928 |
| 2,259,332 | Winkelman | Oct. 14, 1941 |
| 2,314,066 | Ballou | Mar. 16, 1943 |

FOREIGN PATENTS

| Number | Country | Date |
|---|---|---|
| 208,867 | Great Britain | Aug. 9, 1923 |